United States Patent
Billaud et al.

(10) Patent No.: US 11,366,215 B2
(45) Date of Patent: Jun. 21, 2022

(54) SECONDARY RADAR WITH MODE S ADAPTIVE BEAM CONTROL FOR EACH AIRCRAFT

(71) Applicant: THALES, Courbevoie (FR)

(72) Inventors: Philippe Billaud, Limours (FR); Sylvain Colin, Ymare (FR)

(73) Assignee: THALES, Courbevoie (FR)

( * ) Notice: Subject to any disclaimer, the term of this patent is extended or adjusted under 35 U.S.C. 154(b) by 31 days.

(21) Appl. No.: 16/933,726

(22) Filed: Jul. 20, 2020

(65) Prior Publication Data
US 2021/0033721 A1    Feb. 4, 2021

(30) Foreign Application Priority Data
Jul. 29, 2019  (FR) ...................................... 1908592

(51) Int. Cl.
 *G01S 13/76* (2006.01)
(52) U.S. Cl.
 CPC .......... *G01S 13/762* (2013.01); *G01S 13/767* (2013.01)
(58) Field of Classification Search
 CPC ..... G01S 13/762; G01S 13/767; G01S 13/782
 See application file for complete search history.

(56) References Cited

U.S. PATENT DOCUMENTS

| | | | |
|---|---|---|---|
| 5,218,365 A | | 6/1993 | Woodall |
| 5,424,747 A | * | 6/1995 | Chazelas ................... G01S 1/14 342/70 |

(Continued)

FOREIGN PATENT DOCUMENTS

| | | |
|---|---|---|
| FR | 2 965 063 A1 | 3/2012 |
| WO | 2010/049284 A1 | 5/2010 |

OTHER PUBLICATIONS

Weber, et al., "Secondary Surveillance Phased Array Radar (SSPAR): Initial Feasibility Study", pp. 1-41, Feb. 6, 2014.

*Primary Examiner* — Timothy X Pham
(74) *Attorney, Agent, or Firm* — BakerHostetler

(57) ABSTRACT

A radar includes an antenna having a radiating pattern forming a sum channel, a radiating pattern forming a difference channel and a pattern forming a control channel, and generates at least interrogation messages on the sum channel and interrogation messages on the control channel; transmits messages via the sum channel and via the control channel respectively, and receives and processes signals received via the sum, difference, and control channels, configured for detecting replies of targets on the signals received via the sum and difference channels and carrying out monopulse processing and RSLS processing on the replies. The transmission is configured such that, for each target, the width of the beam for transmitting interrogations and receiving mode S selective replies is controlled based on the movement window of the target and position of the axis of the antenna in the window, to provide detection of the target by reducing the number of selective interrogations by a selective sub-interrogation of the target while ensuring precise positioning in azimuth: by pre-locating the target at the edge of the main reception lobe of the antenna by deviation measurement between the signals received on the difference and sum channels; and by selectively re-interrogating the pre-located target in mode S by calculation of the roll-call signal nearest to the centre of the main lobe to ensure precision in azimuth, without any other unnecessary supplementary interrogation.

9 Claims, 14 Drawing Sheets

(56) References Cited

U.S. PATENT DOCUMENTS

| | | | | |
|---|---|---|---|---|
| 2008/0238758 A1* | 10/2008 | Billaud | ................ | G01S 13/782 |
| | | | | 342/32 |
| 2009/0085792 A1 | 4/2009 | Ino | | |
| 2011/0090053 A1* | 4/2011 | Soula | ..................... | H01Q 25/02 |
| | | | | 340/10.1 |
| 2012/0068878 A1* | 3/2012 | Billaud | .................. | G01S 13/44 |
| | | | | 342/37 |
| 2019/0353772 A1* | 11/2019 | Sundell | .................. | G01S 7/032 |
| 2019/0355260 A1* | 11/2019 | Billaud | ................ | G01S 13/762 |

* cited by examiner

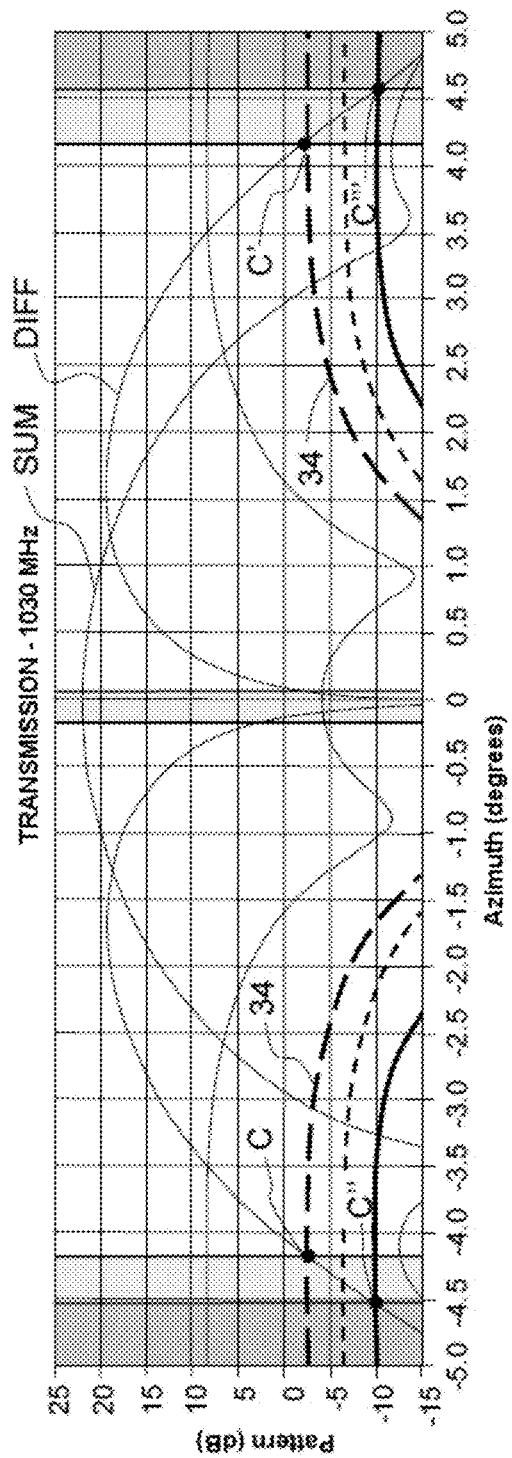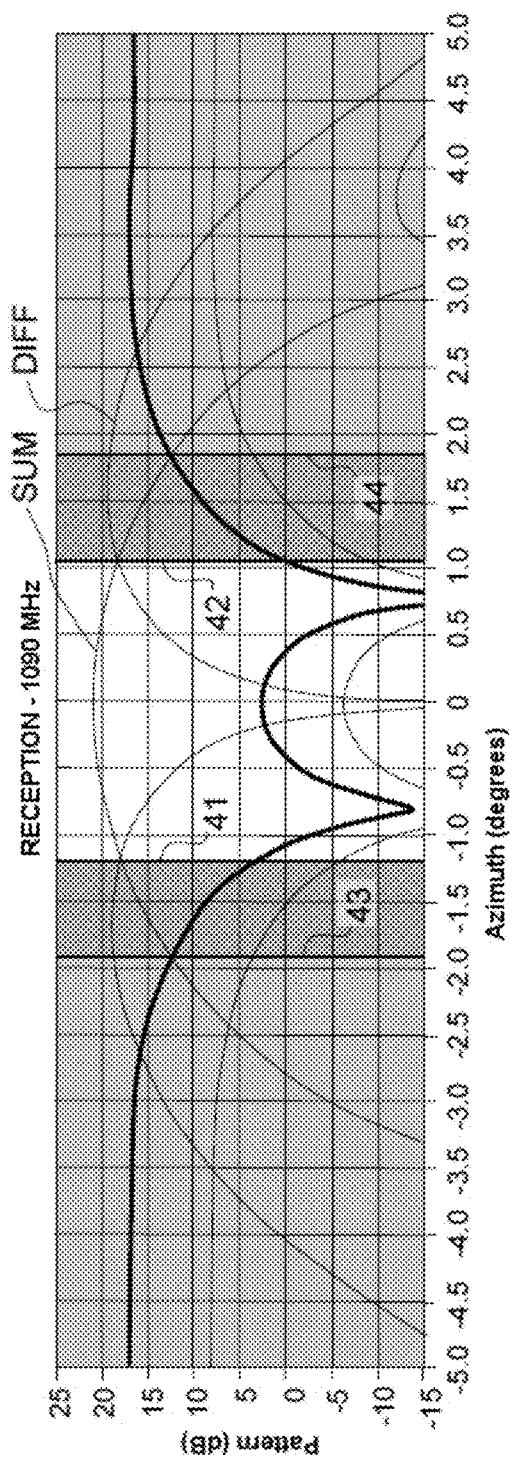
FIG.3c
FIG.4a

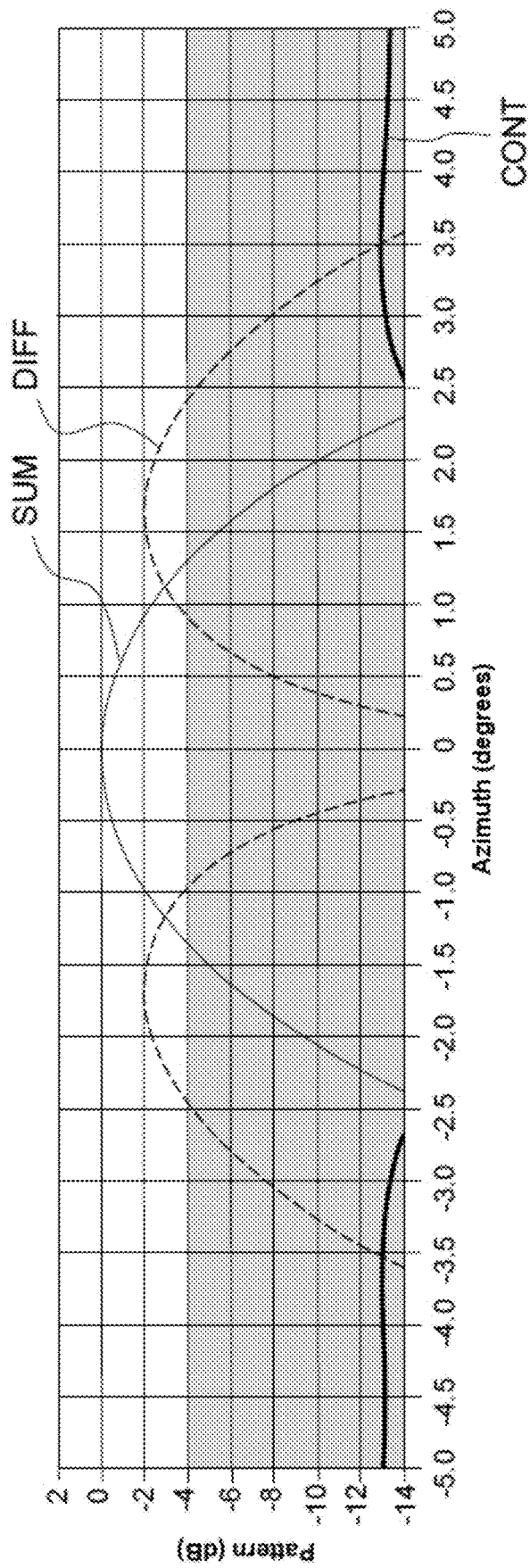

SECONDARY RADAR WITH MODE S ADAPTIVE BEAM CONTROL FOR EACH AIRCRAFT

CROSS-REFERENCE TO RELATED APPLICATIONS

This application claims priority to foreign French patent application No. FR 1908592, filed on Jul. 29, 2019, the disclosure of which is incorporated by reference in its entirety.

FIELD OF THE INVENTION

The present invention relates to a secondary radar (SSR Secondary Surveillance Radar) with mode S adaptive beam control for each aircraft, notably in the control of moving targets very near the radar, of high sectoral workloads in terms of aircraft to be processed, and of long-distance targets, this control being particularly adapted to the type of target (short, medium and long-range).

A preferred field of the invention is air traffic control (ATC), for which the performance of the radars used is fundamental, especially as regards aircraft detection. Additionally, new standards require minimum performance for each trajectory in radar coverage, which is particularly difficult to provide for distant targets, where the RF level is low with a high sensitivity to undesired targets of the FRUIT ("False Reply Unsynchronized in Time") type notably, and very high sectoral workloads in terms of aircraft, while performing a plurality of EHS ("Enhanced Surveillance") transactions per rotation for each aircraft, with an added requirement for a very low re-interrogation rate.

BACKGROUND

Air traffic control is mainly based on mode S radar, whose reliability in terms of detection and decoding is recognized.

The performance of a mode S radar is therefore directly determined by the availability of the aircraft with which it interacts. Specifically, a secondary radar, unlike a primary radar, is distinguished by the fact that it establishes an interaction based on:

a selective interrogation aimed at a precise target via its mode S address at 1030 MHz;

a reply of the transponder of the aircraft encoded with its mode S address at 1090 MHz.

An ATC secondary radar is designed to detect and locate precisely targets at very long ranges, typically exceeding 470 km or 250 Nm. Its mechanical antenna, which is often rotating, has a high gain and a very narrow azimuth beam of about 2.4°, related to the physical width of the antenna which is usually 9 m. The target illumination time is therefore relatively short, being conventionally 30 to 100 milliseconds, depending on the rotation speed of the radar. Consequently, any loss of illumination time is a real limit to the performance of the radar.

The transponder of an aircraft interacts with all the secondary radars around it. Its interaction capacity is physically limited, but must conform to the minima specified by ICAO Annex 10. Beyond these limits, which are ultimately very low with 16 mode S long replies per second, such as those required for EHS surveillance which is the operating mode currently required in Europe, the transponder may not respond to the selective interrogation of radars. However, the detection probability of a radar is defined on the basis of a 90% availability of the transponder in the effective lobe width (EBW, Effective Beam Width), corresponding to a duration of between 30 and 100 ms.

Additionally, if an interrogation is received, even if it does not relate to the aircraft, the latter is blocked for a given time (the maximum value is specified in ICAO Annex X, vol. IV). This reduces the availability of the transponder, since the latter does not respond to the interrogations that it receives in this period, and even reduces the effective range of the radar.

In the typical case of an airport radar, although this is also applicable to en-route radar where there are often fewer targets concerned, near targets (often at a distance of less than 5 NM, but possibly up to several tens of NM) have windows of movement of the predicted position with a large azimuth, up to 20° for example (on the approach, the trajectory of a target aircraft may in fact vary in such a way that its position can be best predicted only in these windows following the possible trajectory movement of the aircraft during manoeuvring around an airport, this phenomenon obviously being more pronounced in the case of a military aircraft which is inherently more manoeuvrable). An ATC radar with a rotating mechanical antenna usually has a single beam with an EBW (Equivalent Bandwidth) of the order of the lobe at 3 dB, that is to say 2.4°. While hunting a near target, the radar samples the movement window with its narrow beam, which conventionally results (for most targets in practice that are not moving but may potentially move, in a race track pattern for example) in more than 15 selective interrogations, most of which are frequently unnecessary (typically 13 out of 15) because in most cases the aircraft has not performed any manoeuvre (straight trajectory) and is therefore at the predicted position, subject to any potential movement.

These interrogations therefore lead to:

a loss of radar time, since they replace the illumination period of the other targets, thus reducing the mode S data extraction power of the radar (BDS (commB Data Selector) data register required in EHS), and even the maximum number of targets that it can detect in a sector;

pollution of the other targets which are momentarily blocked for interrogations not relating to them, thereby resulting in the generation of new interrogations by the other radars for these other targets.

SUMMARY OF THE INVENTION

One object of the invention is, notably, to reduce the aforesaid drawbacks.

For this purpose, the invention proposes a secondary radar comprising an antenna having a radiating pattern forming a sum channel, called SUM, a radiating pattern forming a difference channel called DIFF and a pattern forming a control channel called CONT, means for generating at least interrogation messages on the SUM channel and ISLS signals on the CONT channel, means for transmitting these messages via the SUM channel and via the CONT channel respectively, and means for receiving and processing the signals received via the SUM, DIFF and CONT channels, configured for detecting the replies of targets on the signals received via the SUM and/or DIFF channels and carrying out deviation measurement processing and RSLS processing on these replies, the transmission means being configured so that, for each target independently, the width of the beam for transmitting interrogations and receiving mode S selective replies is controlled dynamically on the basis of the movement window of said target and the position of the axis of said antenna in said window, in order to provide the detection of said target while reducing the number of selective interrogations by a selective sub-interrogation of said target and while ensuring its precise positioning in azimuth:

by pre-locating said target at the edge of the main reception lobe of said antenna by deviation measurement between the signals received on the DIFF and SUM channels;

by selectively re-interrogating said pre-located target in mode S by calculation of the roll-call period nearest to the centre of said main lobe to ensure precision in azimuth.

In a particular embodiment, the transmission means are configured in such a way that, for each target, the width of the beam for transmitting interrogations and receiving mode S selective replies is controlled on the basis of the pre-evaluated number of selective transactions to be processed in a given azimuth, said beam being widened independently for each target if said number is greater than the potential achievable number of selective transactions in a standard beam:

by distributing what are known as "data link" transactions outside said standard beam, which is then mainly dedicated to surveillance;

by pre-locating the target at the edge of said main lobe by extended deviation measurement, using the replies received on the DIFF and SUM channels;

by retaining a transaction, of a "data link" or other type, and selectively re-interrogating said pre-located target in mode S by calculation of the roll-call signal nearest to the centre of said main lobe to ensure precision in azimuth.

The increase in the width of said mode S selective interrogation transmission beam is achieved, for example, by attenuation of the field radiated by the CONT pattern.

The means for generating interrogation messages also being configured for additionally generating interrogation messages on the DIFF channel, and the transmission means also being configured to be capable of transmitting these messages via the DIFF channel of the antenna, said radar pre-locates, for example, the target at the edge of said main lobe by deviation measurement, using the replies received on the DIFF and CONT patterns.

In a particular embodiment, the transmission means are configured in such a way that, for each target, the width of the beam for transmitting interrogations and receiving mode S selective replies is controlled on the basis of the pre-evaluated number of selective transactions to be processed in a given azimuth, said beam being widened if said number is greater than the potential achievable number of selective transactions in a standard beam:

by distributing what are known as "data link" transactions outside said standard beam, which is totally allocated to surveillance;

by pre-locating the target at the edge of said main lobe by highly extended deviation measurement, using the replies received on the DIFF and CONT patterns; by retaining a transaction, of a "data link" or other type, and selectively re-interrogating said pre-located target in mode S by calculation of the roll-call signal nearest to the centre of said main lobe to ensure precision in azimuth.

The increase in the width of said mode S selective interrogation transmission beam is achieved, for example, by using the DIFF channel for transmitting said interrogations and reducing the field radiated (34) by the CONT pattern.

The transmission means are, for example, configured in such a way that, for each target, the width of the beam for transmitting interrogations and receiving mode S selective replies is controlled on the basis of a rate of detection of the aircraft replies for which the number of interrogations is thus potentially doubled by selectively interrogating each target of this type successively on DIFF, then SUM, and finally on DIFF if this is still necessary.

The secondary radar is, for example, of the ATC or IFF type.

BRIEF DESCRIPTION OF THE DRAWINGS

Other characteristics and advantages of the invention will be apparent from the following description, which refers to the attached drawings in which:

FIGS. 3a-3c show different possible settings of the transmission beam, of the "Standard Beam", "Wide Beam" and "Enhanced Wide Beam" type, respectively;

FIGS. 4a-4b show, respectively, an illustration in reception of a conventional beam setting and an illustration of reception beam settings according to the invention;

FIGS. 9a-9b show an illustration of the mode S transactions for a target at a very long distance.

DETAILED DESCRIPTION

As is shown in greater detail in the following description, the solution provided by the invention consists in optimized control of the effective beam width of an ATC radar, or an IFF radar, depending on the application, by adapting it in a dynamic manner to the characteristics of the target concerned and to the tasks to be performed by the radar with the target.

When a target is close, or even at medium distance, both the uplink (transmission at 1030 MHz) and the downlink (reception at 1090 MHz) results are very good for most aircraft, because they are not at very high elevation (≈<40°). It is therefore possible to increase the effective beam width (denoted EBW) by dynamically and independently adjusting, by mode S transactions (interrogations and replies) of each target, the beam width used in transmission and in coherence in reception.

Figure 1:
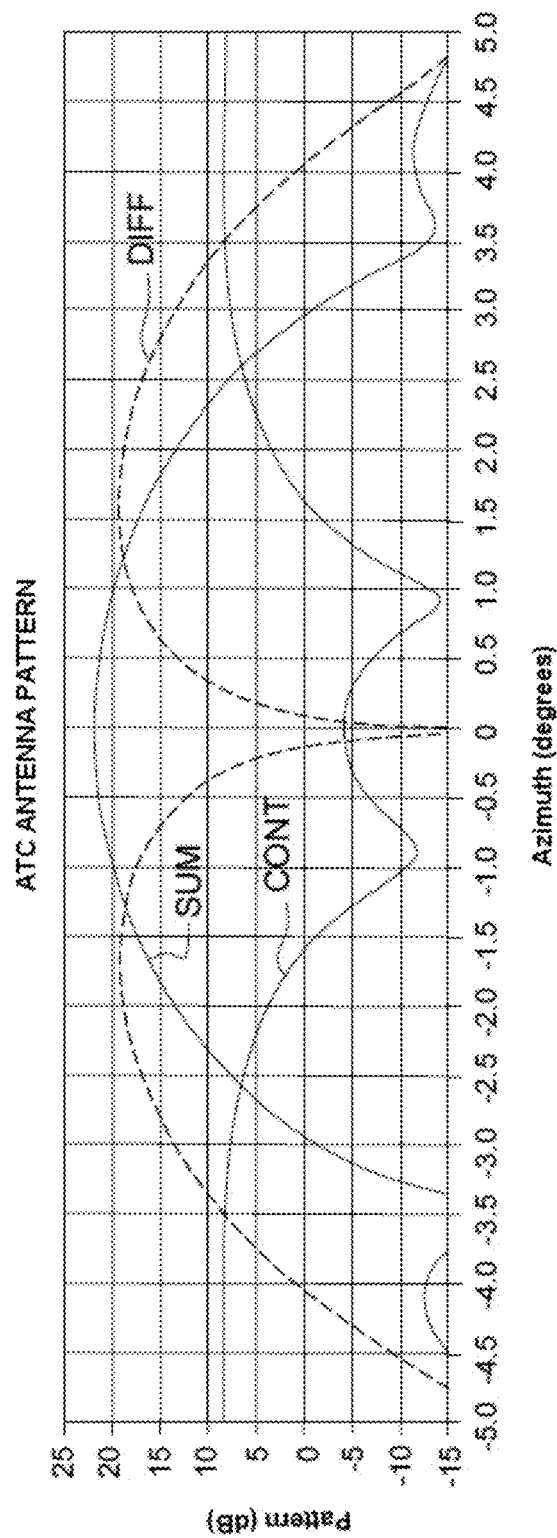
FIG. 1 shows an illustration of the transmission/reception patterns of an ATC antenna used by way of example, the invention being equally applicable to other types of antenna.

Before continuing with the description of the invention, the well-known basic principles, in transmission and reception, of a secondary radar will be summarized with the aid of FIG. 1. By convention, in this figure, the patterns used in transmission and reception are in solid lines and the patterns in broken lines are normally used only in reception.

A secondary radar transmits interrogations at the frequency of 1030 MHz via the sum pattern (SUM) of the antenna, consisting of a transmission lobe delimited in azimuth by the ISLS ("Interrogation Side Lobe Suppression") pulse transmitted via the control pattern (CONT) from the same front panel and from the rear patch of the antenna. It receives the replies transmitted at the 1090 MHz frequency by the different targets in reception on the sum pattern (SUM) and on the difference pattern (DIFF) consisting of two symmetrical lobes, the latter channel enabling the targets to be located in azimuth by deviation measurements within the main lobe SUM. These reception patterns are accompanied by side lobes, at a lower level but sufficiently high to permit the undesired reception of a near target outside the axis of the antenna. A reception control channel (CONT) at a higher level than the side lobes is therefore provided, to neutralize detections on the side lobes.

For this purpose, in transmission, in order to avoid transponder replies outside the main lobe of the antenna:

when the ISLS signal level radiated by CONT is above the level of the interrogation radiated by SUM, the transponder of the target does not respond;

when the radiated levels are such that CONT+9 dB>SUM≥CONT, the transponder may or may not respond;

and, finally, when the radiated levels are such that SUM-≥CONT+9 dB, the transponder must respond.

In reception, if the level of the signal received via the CONT channel increased by a signed parameterizable value "RSLS" ("Receiver Side Lobe Suppression") is above the level received via the SUM channel, the radar does not process the reply. The control channel filters to some extent the signals transmitted or captured by the side lobes by processing only the signals whose signal level in a detection via SUM rather than CONT corresponds to a target present in the main lobe.

In practice, usually, to display the guaranteed minimum EBW on an antenna pattern, the level of the CONT channel is generally increased by ISLS=RSLS=9 dB. In other words, the level on SUM is compared with the level on CONT increased by 9 dB. This increase enables the guaranteed effective width of the main lobe of the sum channel to be displayed, this effective width being the aforementioned width EBW. The control channel usually consists of two channels, namely a channel in front of the antenna (CONT_Front) and a channel at the rear of the antenna (CONT_Back). In this case, use is made of the CONT_Front channel, referred to below as the CONT channel.

The lines in FIGS. 3a, 3b and 3c (described below) illustrate three possible settings of the transponders for the decision to reply:

CONT+0 dB: Non-reply limit of the transponder (bold solid line: the transponder does not reply below this);

CONT+9 dB: Limit of the guaranteed reply of the transponder (large bold dashes: the transponder must reply above this);

CONT+5 dB: Mean reply of a typical transponder, i.e. most targets (small bold dashes: the typical transponder replies above this).

It should be noted that the azimuth represents the position of a target or of the axis in the absolute reference frame, while the bearing represents the angle relative to the position of the antenna. Strictly speaking, the patterns of FIG. 1 are dependent on the bearing. The terms azimuth and bearing are used interchangeably below.

Figure 2:
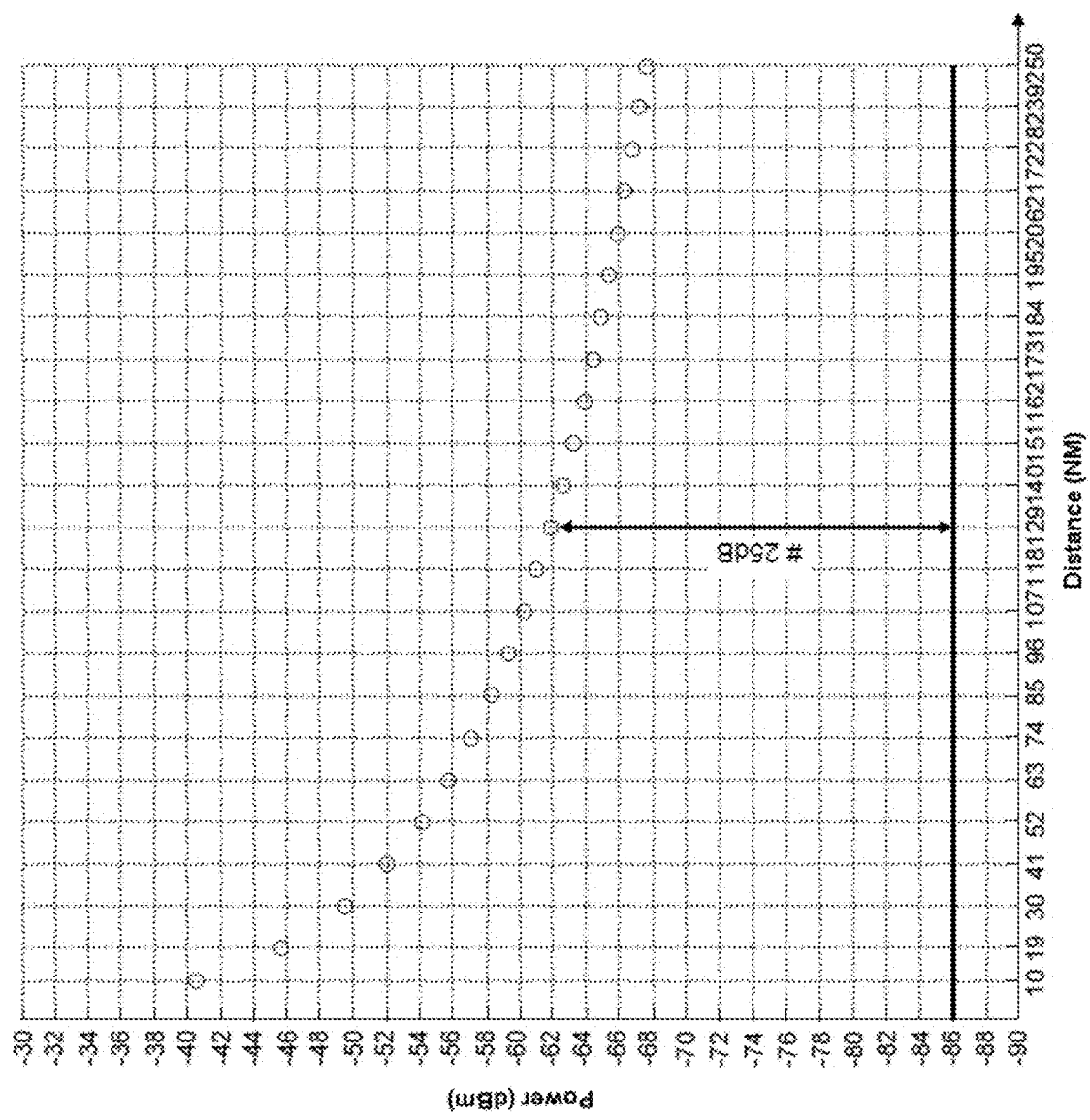
FIG. 2 shows an illustration of the power (in dBm) of a set of plots received by the radar in detection as a function of the distance to the target.

FIG. 2 illustrates the power of a set of detection blips (in dBm) as a function of the distance to the target expressed in NM (nautical miles), for an example of an aircraft with a good sensitivity to radar interrogations and a good power level in its replies to these. This line shows, in the case of a threshold of about −86 dBm for the processing of the replies by the radar, the possibility of increasing the effective lobe by 35 dB up to 30 NM or even by 25 dB up to 120 NM.

The invention uses, notably, this signal margin in two typical cases encountered by a secondary radar, namely the mode S control of near targets and the control of a localized peak overload in azimuth, although the invention is evidently applicable to other cases.

In the case of the mode S control of near targets, the radar calculates the possible position of a target during the antenna rendezvous in the subsequent rotation for carrying out a selective interrogation with the mode S address of this target. According to the missions of the radar, the manoeuvring rate of a target to be followed may be important, mainly if the target is near, and therefore leads to a much larger dimension in azimuth of the movement window (the possible location of the target in the next rotation) than the standard effective lobe of the radar.

According to the invention, the radar dynamically modifies its setting in transmission and in reception to increase its effective beam according to the dimension of the movement window, solely for the selective transactions to be carried out with this target. The aim is twofold:

to reduce the interrogation rate in order to limit contamination;

and thus to limit the loss of radar illumination time in order to process other targets in the same azimuth.

In the case of control of a peak overload of aircraft located in azimuth, more particularly in the case of an azimuth sector (typically 3.5° required) highly loaded with targets with a high rate of mode S selective transactions to be performed (extraction of N "BDS" per rotation per target, frequently N≥2), the period of illumination produced by the standard effective beam (particularly if the radar is rotating rapidly like an airport radar, typically at 4 seconds per rotation) may not allow the provision of all the mode S selective transactions required on all the targets. According to the invention, the radar dynamically modifies its setting in transmission and in reception to increase its effective beam according to the distance of the target, for the purpose of:

shifting all the mode S selective transactions of the data link, except for one, outside the standard effective lobe;

keeping a mode S selective transaction, whether a data link or not, in the standard effective lobe to ensure the precise location of the target, which is the primary ATC surveillance mission of the radar.

Two new types of setting of the effective beam width are considered:

The setting called "Wide Beam", this setting being carried out by always transmitting the mode S selective interrogations on the sum pattern (SUM) and listening to the replies on the SUM pattern and/or the difference pattern (DIFF) with a widened beam (up to 6°), by acting on the settings to suppress the side lobes in the interrogation (ISLS) in transmission by reducing the power of the signals transmitted on CONT by 20 dB, and in reception by reducing the level of RSLS and TVBC ("Time Variable Base Clipping", that is to say the adaptation of the radar detection threshold on the basis of the distance of the target) by −20 dB for example;

The setting called "Enhanced Wide Beam", this setting being carried out by transmitting the selective interrogations on the SUM and/or DIFF pattern and listening to the replies on SUM and/or DIFF with a greatly widened beam (up to 8°), and by also acting on the ISLS settings in transmission by reducing the power of the signals transmitted on CONT by 20 dB, and in reception by reducing the level of RSLS and TVBC by −20 dB for example.

The control channel enables the RSLS function of reply path side lobe suppression to be provided in reception; for this purpose it filters the signals captured by the side lobes by processing only the signals whose signal level received in a detection via SUM or DIFF, rather than CONT, actually corresponds to a target present in the widened main lobe.

In reception, if the level of the signal received via the CONT channel, increased by a parameterizable value "RSLS_SUM", is above the level received via the SUM channel, the radar does not process the reply received on SUM. Similarly, if the level of the signal received via the CONT channel, increased by a parameterizable value "RSLS_DIFF", is above the level received via the DIFF channel, the radar does not process the reply received on DIFF. In the case of the present invention, the thresholds RSLS_SUM and RSLS_DIFF may be reduced to −20 dB.

For the same target, in each mode S transaction, it is possible to move constantly between the three proposed settings: Standard, Wide Beam and Enhanced Wide Beam, or even between these, by adjusting more finely (from 0 to −20 dB), but always in a coherent manner, between:
transmission: the power level on ISLS;
reception: the threshold RSLS_SUM or RSLS_DIFF at the same time as TVBC.

These settings are summarized in the table below, and are then illustrated in regard to FIGS. 3a to 3c and FIGS. 4a to 4b.

In both cases, the parameterized setting of ISLS, RSLS and TVBC enables the beam width EBW to be adjusted with a pitch better than 0.25 degrees.

Therefore, the table below summarizes these settings for a secondary radar according to the invention, in an ATC or IFF application (the values provided by way of example correspond to an ordinary ATC antenna).

possible, in the hunting phase (the search for the position of the target in the movement window), on the basis of the position of the antenna relative to the predicted position, to sample the movement window (by selective interrogations) with the different beam settings: "Wide Beam" (≈6°) and "Enhanced Wide Beam" (≈8°) 8°, that is to say therefore with a pitch henceforth more than 2 to 3 times the pitch of the standard beam denoted "Standard Beam" (≈2.4°), thereby reducing the number of interrogations in the same ratio.

It may be noted that the change from one beam to the other is parameterizable by the operator a priori on the basis of the probability of movement of the targets and their rates of reply; thus the azimuths covered by different interrogations can be made to overlap to adapt to aircraft with a low rate of reply to the detriment of the number of interrogations transmitted.

In a detection, the position of a target is pre-located in azimuth, using the characteristics of the antenna and the levels received (or not received) on the three patterns SUM, DIFF and front control (CONT_front).

Then, during the interaction phase with the target, all the remaining data link transactions (extraction of BDS or others) are executed, except for one, a priori, outside the surveillance lobe (≈2.4°). To further improve the azimuth precision of the radar and avoid over-interrogation, the RC (Roll Call) period for which the target is nearest to the antenna axis (minimum gain on DIFF and maximum gain on SUM) is calculated in order to carry out the final interrogation (for surveillance only or possibly for a data link), using the pre-located position in azimuth established with sufficient precision during detection in the hunting phase.

The invention proposes optimized control of the effective beam (EBW) of an ATC/IFF secondary radar, using the existing overhead components (antenna, rotating joint, cables) thanks to a dynamic adaptation to the characteristics

TABLE 1

| Type of setting | Transmission 1030 MHz | | Reception 1090 MHz | | | EBW | EBW | Target applications |
|---|---|---|---|---|---|---|---|---|
| | TX | ISLS dB | RX | RSLS dB | TVBC Law | near degree | distant degree | |
| "Standard beam" (Standard setting) | SUM | 0 | SUM | 9 | 3 | (4) ≈2.4 | ≈2.4 | Mode S & Non-Mode S any range |
| "Wide Beam" | SUM | −20 | SUM + DIFF | −20 | none | >6 | ≈2.4 | Mode S near to medium range |
| "Enhanced Wide Beam" | DIFF or SUM | −20 | SUM + DIFF | −20 | none | >8 | ≈6 | Mode S near to long range |

Conventionally, when the effective lobe width is around +/−2° in the near range, existing radars mainly use the part of the deviation measurement that is useful in mode S for surveillance, that is to say +/−1.2° over the whole range, resulting in the width of 2.4° shown in the table above.

The table also shows the standard setting ("Standard beam"), transmitting selective interrogations on the SUM channel and listening to the replies on the SUM channel with the standard beam having a width substantially equal to the surveillance lobe, that is to say 2.4°, to provide a usable, high-quality deviation measurement f(DIFF/SUM) for the azimuth precision of the radar out of the possible 4° of the effective beam EBW.

By using these settings in the two aforesaid examples of control ("Wide Beam and Enhanced Wide Beam"), it is of each target concerned. This is done by controlling, for each mode S transaction (interrogation and reply) for each mode S target, independently of the other mode S targets, for at least the three different beam types below (value adjustable between them with a pitch that may be as small as 0.25°, depending on the radar rotation speed):
"Enhanced Wide Beam" (maximum EBW≥8°);
"Wide Beam" (maximum EBW≥6°);
"Standard Beam" (typical EBW≥2.4°).

For mode S near targets, the dynamic adaptation is carried out by scanning the movement window of these targets:
in the hunting phase, using a wider beam ("Wide Beam" or "Enhanced Wide Beam") to drastically reduce the selective interrogation rate (two to three times less than at present);

in the location phase, after detection, by returning to a standard beam ("Standard Beam") and improving the azimuth precision of the radar on this type of target by retaining an interrogation in the centre of the lobe.

For mode S targets up to a medium distance, the dynamic adaptation is carried out by distributing the transactions by kind in the beam:

by executing all the data link transactions except one at the lobe edge of the standard beam, therefore within about ±1.2° and the widened lobe ("Wide Beam" within about ±3°, or "Enhanced Wide Beam" within about ±4°);

by retaining a transaction (data link or other) for location in azimuth as near as possible to the lobe centre.

Figure 3A:
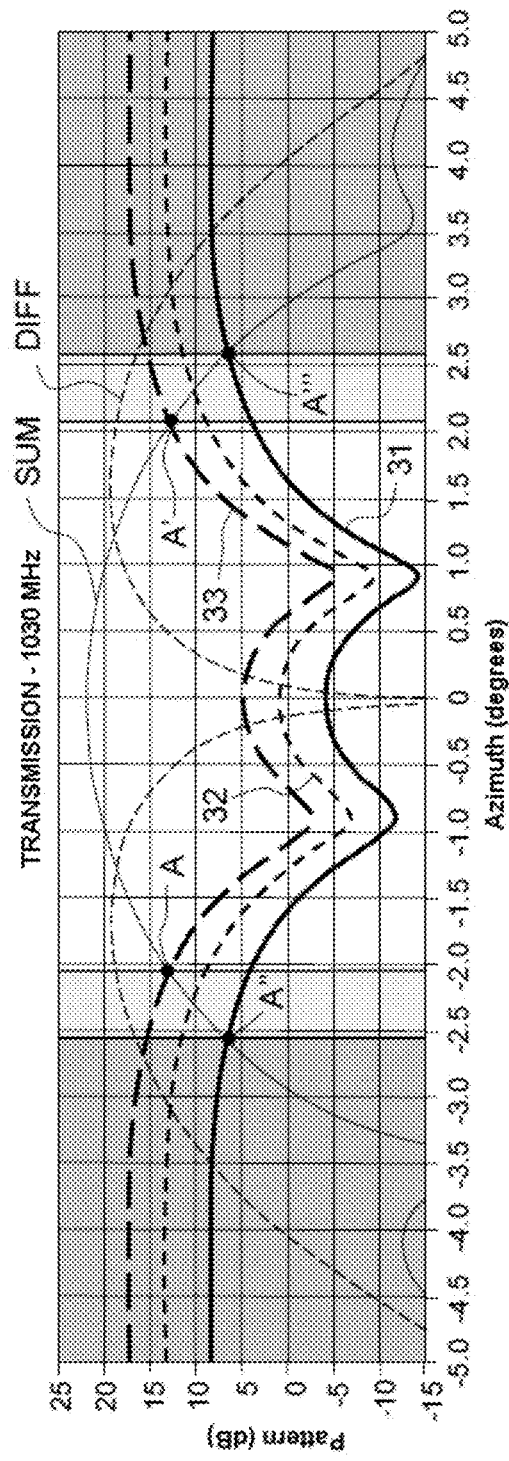
Figure 3B:
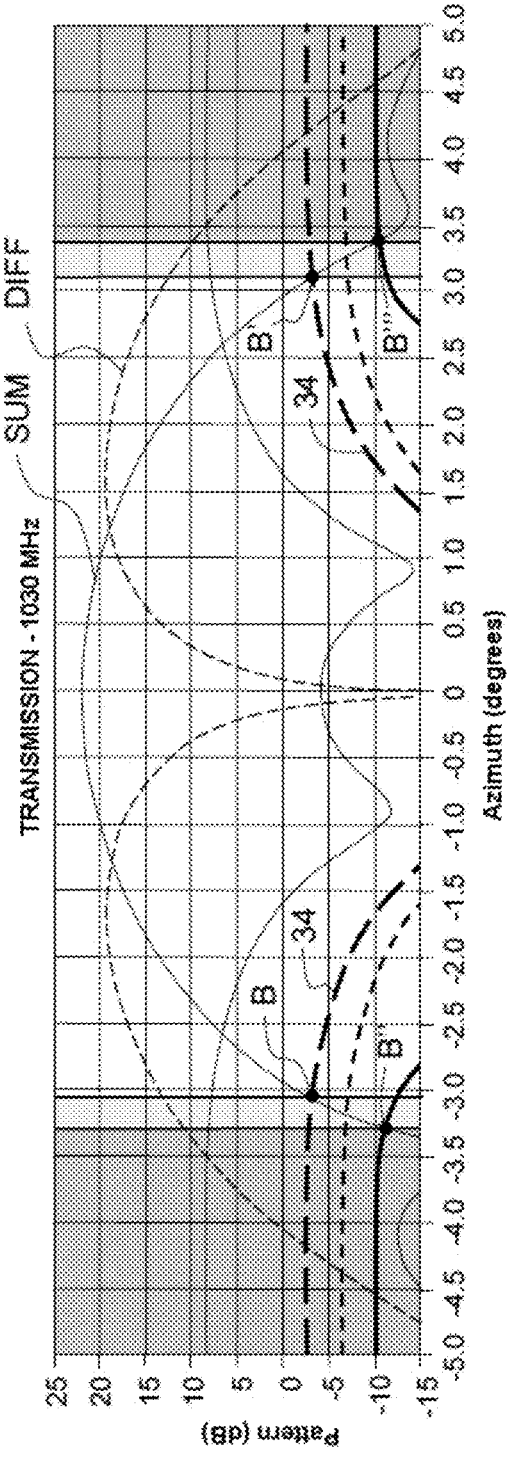

FIGS. 3a, 3b and 3c illustrate the different settings of the transmission beam, for an LVA antenna, resulting in the beam of the "Standard Beam" type (FIG. 3a), the beam of the "Wide Beam" type (FIG. 3b), and the beam of the "Enhanced Wide Beam" type (FIG. 3c). The antenna is an ATC antenna.

The antenna comprises:
a SUM pattern for the interrogations;
a CONT pattern for blocking the transponders outside the main lobe;
a DIFF pattern, usually not used for transmission, for locating the targets in the lobe in reception.

Figure 4B:
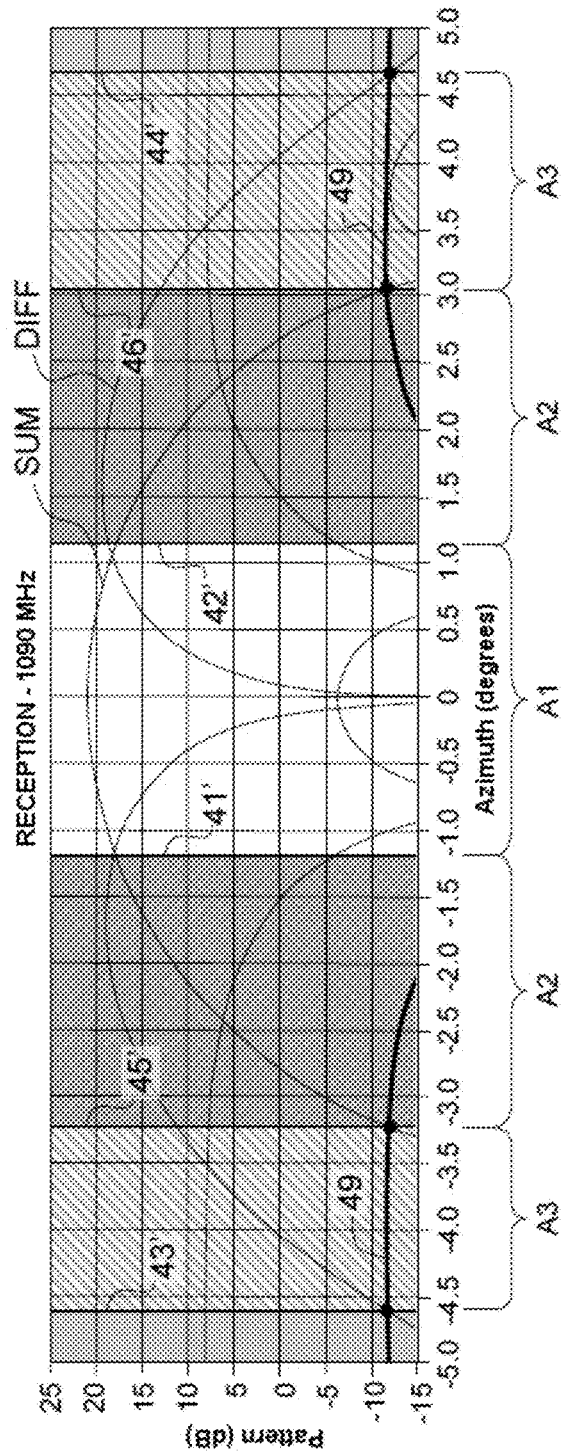

By convention, in these figures and the following figures in azimuth, the bold lines, whether solid or broken, correspond to the processing decision of the receiver based on the energy radiated on the CONT pattern and its internal parameters:
either from the transponder, for FIGS. 3a, 3b, and 3c:
or from the radar, for FIGS. 4a and 4b.

FIGS. 3a, 3b and 3c show the SUM, DIFF and CONT patterns in the azimuth plane, for transmission. The patterns of the antenna remain fixed; it is the radiated energy that is modulated in power to permit the different settings of the EBW_TX.

The setting of the effective lobe in transmission is carried out via the ISLS signal level, an essential function of which is to block the transponders outside the main beam, which may be interrogated involuntarily by the interrogations radiated via the side lobes.

ATC antennae are very large, in order to be very high-quality, with very low side lobes which make it possible to interrogate via a side lobe without any risks, especially in mode S which is naturally selective.

The level of energy radiated by the CONT pattern therefore varies, enabling the effective width of the transmission beam (EBW_TX) to be increased, the effective width being defined between the two points of intersection between the SUM pattern (as opposed to DIFF) and the ISLS pattern (typically, CONT pattern+power difference between selective interrogation on SUM_vs DIFF and the signal on CONT which is an intrinsic setting of the transponder) at a given position in azimuth of the target relative to the axis of the antenna. FIG. 3a illustrates the case of the standard setting ("Standard Beam"—first setting in the table):

The curve 31 represents the threshold of a transponder set at 0 dB, that is to say the pattern radiated by CONT, since the ISLS power transmitted is equal to that of the interrogation on SUM: that which gives the largest EBW_TX;

The curves 32, 33 in broken lines correspond to rises in the CONT pattern according to the other two possible settings of a transponder:

the curve 33 illustrates the setting at +9 dB, conventionally used to define the guaranteed EBW_TX of a transponder;

while the curve 32 illustrates the setting at +5 dB, typically providing the average EBW_TX of a transponder.

The points of intersection A, A' between the SUM and CONT curves delimit the guaranteed effective lobe width available at the transponders, essentially less than 4°. The points A" and A'" delimit the maximum effective lobe width in the "Standard Beam" setting.

FIG. 3b corresponds to a first widening of the effective lobe, corresponding to the "Wide Beam" setting (second setting in the table).

The effective beam width is obtained here by reducing the energy radiated by the CONT pattern by 20 dB, illustrated by the curve 34, delimited by the intersection points B, B'. The guaranteed effective beam EBW is substantially equal to 6°. The points B" and B'" delimit the maximum effective lobe width in the "Wide Beam" setting.

It should be specified that the invention is, notably, applicable with the "Wide Beam" setting only.

FIG. 3c illustrates an additional widening, the greatest widening corresponding to the "Enhanced Wide Beam" setting (the third setting in the table). In this configuration, the same reduction of the CONT pattern is retained, as illustrated by the curve 34, but the mode S selective interrogations are mainly transmitted on the DIFF pattern. The guaranteed effective beam width is thus delimited by the intersection points C, C' between the CONT pattern and the DIFF pattern. The guaranteed effective beam width is here substantially equal to 8°. The points C" and C'" delimit the maximum effective lobe width in the "Enhanced Wide Beam" setting.

The transmission on the DIFF pattern is carried out by the method described in the French patent application published under the number 2,965,063.

In terms of hardware, the secondary radar therefore comprises an antenna having a radiating pattern forming the SUM channel, a radiating pattern forming the DIFF channel, and a radiating pattern forming the CONT channel, and means for generating mode S interrogation messages on the SUM channel and means for generating ISLS signals on the CONT channel, together with means for transmitting these messages via the SUM and CONT channels. It also comprises means for providing the reception and processing of the signals received via the SUM, DIFF and CONT channels, configured for detecting the replies of targets (aircraft) in the signals received via the SUM channel and executing monopulse processing and SLS processing on these replies, using the signals received via the DIFF channel (for the deviation measurement) and CONT channel (for the suppression of the side lobes—RSLS) of the antenna.

In order to implement transmission on the DIFF pattern, and therefore obtain a widened beam of the "Enhanced Wide Beam" type, the means for generating interrogation messages are also configured for additionally generating interrogation messages on the DIFF channel, and the transmission means are also configured to be capable of transmitting these messages via the DIFF channel of the antenna.

FIGS. 4a and 4b show the settings in reception at 1090 MHz. In reception, the SUM channel is used for the detection of the replies, the CONT channel is used for filtering the replies outside the main lobe, and the DIFF channel is used conventionally for locating the replies by deviation measurement, but may also be used for detection.

FIG. 4a illustrates a conventional setting. The standard limits of the conventional deviation measurement function, which uses the DIFF and SUM patterns practically between the points where SUM=DIFF, are defined by the lines 41, 42, corresponding to the intersections between the SUM and DIFF patterns. The angular limits of the transmission are defined by the lines 43, 44, corresponding to the intersections between the SUM and CONT patterns raised by RSLS at 9 dB.

FIG. 4*b* illustrates a setting according to the invention. In this setting, the invention uses a maximum effective lobe in detection (transmission), delimited:

either by the straight lines 45', 46' corresponding to the intersection of the SUM pattern and the CONT pattern in the position reduced by the typical maximum amount of 20 dB, curve 49;

or by the straight lines 43', 44' corresponding to the intersection of the DIFF pattern and the CONT pattern in the position reduced by the typical maximum amount of 20 dB, curve 49;

Within this limit, the lobe consists of three parts:

a first azimuth area A1 delimited by the straight lines 41', 42' corresponding to the intersections of the SUM and DIFF patterns, for surveillance in centred deviation measurement f(DIFF/SUM) with the accuracy required for the mission of the radar, usually up to about ±1.2°;

a second area A2 delimited by the symmetrical straight lines 45', 46', outside the preceding straight lines 41', 42', for surveillance in extended deviation measurement f(DIFF/SUM) for less fine location of a target in the lobe for the purpose of re-interrogating it in the first area, typically at about ±1.2° to about ±3°;

a third area A3, corresponding to the maximum lobe, delimited by the aforesaid straight lines 43', 44', for pre-locating less precisely in deviation measurement according to the invention f(DIFF/CONT) a target in the lobe for the purpose of re-interrogating it in the first area, typically at about ±2.5° to about ±4.5°; in fact, the deviation measurement according to the invention f(DIFF/CONT) may also be advantageously used in area A2, especially when the power received on CONT becomes greater than that received on SUM, that is to say from +/−2.5°.

It should be noted that the setting of the effective lobe in reception is carried out via the level of the RSLS signal, the essential function of which is to suppress transponder replies outside the main beam, since these are usually FRUITs or synchronous replies reflected from obstacles.

The setting of the effective lobe in reception is also carried out by suppression of the TVBC law which conventionally limits the dynamics of the processed replies to not more than 15 dB below the maximum of SUM in the lobe. Again, in mode S the selective aspect of the reply expected fairly precisely in azimuth and in distance makes it possible to reduce both the RSLS threshold and the signal level required by TVBC without a risk of false detection, or even to suppress it.

According to the invention, a pre-location is carried out:

by the extended deviation measurement (a function of the levels on SUM and on DIFF) for lobe edge detection, typically up to about +/−2.5°;

by a new deviation measurement (a function of the levels on DIFF and on CONT) for lobe edge detection, typically from +/−2.5° up to +/−4.5°;

to complement the precise deviation measurement f(DIFF/SUM) applicable in the main lobe.

The aim of this pre-location in azimuth is to enable the next RC nearest the centre of the main lobe to be chosen for selectively interrogating this target again in order to provide subsequent detection with the most accurate azimuth surveillance location (since the greatest accuracy in deviation measurement is found at the centre of the lobe).

Aircraft moving at a short and medium distance from the radar show highly dynamic behaviour in relation to the radar interrogations and to the transponder replies, making it possible to provide a level higher than the detection threshold both of the transponder and the radar, despite an attenuation of nearly 35 dB caused by the lobe modulation. This advantageously enables the effective lobe width EBW to be increased by adjustment.

However, since the signals at the edge of a widened lobe are at a lower level than those at the lobe centre, they are more "fragile", and therefore widened beams are used only when they make a functional contribution to the sequencing of the radar, but not only for the two cases of application cited.

The effective radiated beams EBW take into account the combinations of:

the transmission patterns with the transmission settings;

the reception patterns with the reception settings, to form:

the beam denoted "Standard Beam" (the standard setting in secondary radar):

Transmission of interrogations on SUM with setting of the transponder reply lobe by maximum ISLS on CONT (+9 dB): reduced to the near reception area of the surveillance;

Reception of the replies on SUM with setting of the transponder reply processing lobe by RSLS (9 dB for example, adapted to the transponder with minimum ISLS) and a TVBC law to limit false alarms, mainly useful in an SSR protocol;

the beam denoted "Wide Beam":

Transmission of interrogations on SUM with widening of the transponder reply lobe by ISLS on CONT which is attenuated (−20 dB for example);

Reception of the replies on SUM and/or DIFF with widening of the transponder reply processing lobe by attenuated RSLS (−20 dB for example) and a TVBC law attenuated by 20 dB or eliminated;

the beam denoted "Enhanced Wide Beam":

Transmission of interrogations on DIFF with widening of the transponder reply lobe by ISLS on CONT which is attenuated (−20 dB for example), this transmission being described below;

Reception of the replies on DIFF and SUM and with widening of the transponder reply processing lobe by attenuated RSLS (−20 dB for example) and a TVBC law attenuated by 20 dB or eliminated.

The optimized control of near mode S targets will now be described.

An aim of this use of the invention is to reduce the interrogation rate of the radar for a target, mainly at a short distance from the radar. Specifically, for this type of target, the potential movement of the target, following a possible manoeuvre, between two detections makes it necessary for the hunting window of the radar in the next rotation for this target to be widened well beyond the beam EBW, because of the uncertainty of the trajectory of the target (the window of movement of the target between the rotations), on the basis of:

both the period of rotation of the radar antenna;

and the possible rate of manoeuvre of the targets to be tracked (rate of amplitude of the uncertainty of the trajectory).

The principle of the invention consists in dynamically modifying the mode S effective beam EBW for the target concerned according to the position of the axis of the antenna relative to the predicted position of the target. The predicted position is that which corresponds to a continuity in the flight of the target since the preceding antenna rotations. In practice, it is the most probable position.

The adaptation of the effective lobe EBW is carried out as the axis of the antenna and the predicted position approach each other, according to the equipment level of the radar, complete equipment allowing processing by beams of the "Enhanced Wide Beam", "Wide Beam" and "Standard Beam" types, while ordinary equipment allows processing by beams of the "Wide Beam" and "Standard Beam" types.

The moments of switching from one effective lobe to the other are completely parameterizable by an operator according to, notably:

the mission of the radar;

the type of target to be detected (its rate of reply, its capacity for movement, etc.);

the constraints on the re-interrogation rate in the area of the target, which may depend, notably, on the azimuth of the target;

the number of mode S transactions to be carried out per aircraft and per rotation, notably at this azimuth.

Figure 5:
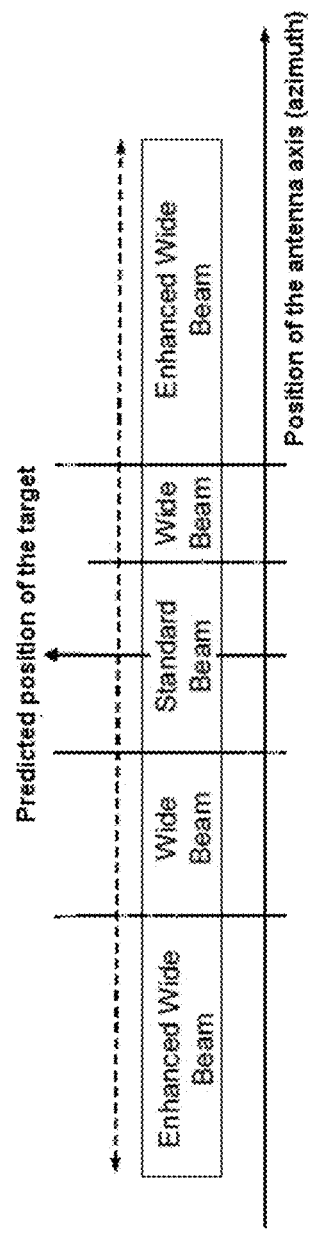
FIG. 5 shows an illustration of the principle of dynamic control of a beam according to the position of the antenna axis (in azimuth) in relation to the possible position window of a moving target.

FIG. 5 illustrates the principle of dynamic control of a beam according to the position of the antenna axis (in azimuth) in relation to the possible position window of a moving target, for a radar with complete equipment. More precisely, FIG. 5 illustrates the different beams ("Enhanced Wide Beam", "Wide Beam" and "Standard Beam") in relation to the predicted azimuth position of the target, the beams themselves being represented as a function of the antenna axis (misalignment) relative to the azimuth (predicted position) of the target.

In the window of movement of a target, on the basis of the misalignment of the antenna axis relative to the predicted position (the latter representing the most probable position of the target in view of its earlier flight in the preceding rotations), the radar control adapts the beam width ("Enhanced Wide Beam", "Wide Beam" or "Standard Beam") during a selective interrogation independently for each target.

In the case of a movement window which is large relative to the standard beam, the use of a widened beam enables the interrogation rate of the radar to be reduced while still providing certainty of detection of the target, conventionally, by adopting an interrogation pitch in degrees of the order of a half-beam for example, in other words:

in "Standard Beam": 1.2°;

in "Wide Beam": 3°;

in "Enhanced Wide Beam": 4°.

When the target is located, the radar adapts the beam used according to the remaining task to be performed with this target and its position in the beam at the time of its detection:

retention of the widened beam to finalize the data link (see the example below); switching to the standard beam (Standard Beam) for precise surveillance location.

Figure 6A:
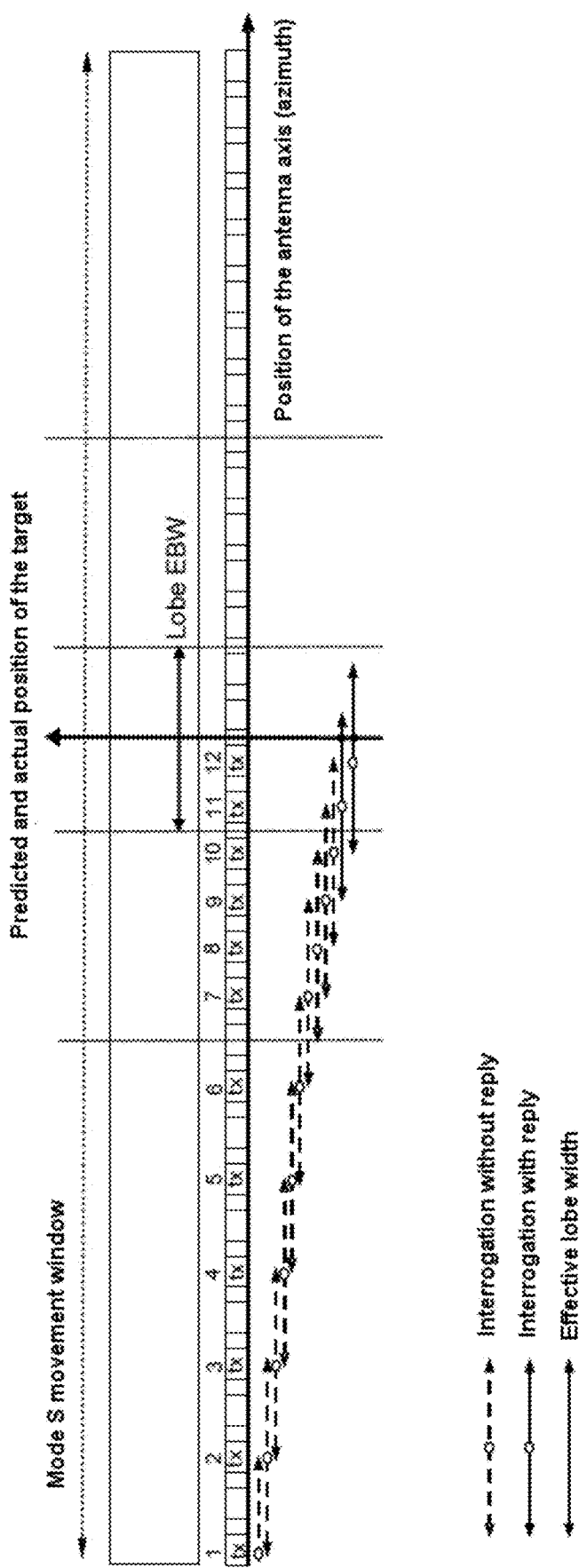
FIGS. 6a-6b show an illustration of interrogation sequencings for a non-moving target, of the standard type and according to the invention, respectively.
Figure 6B:
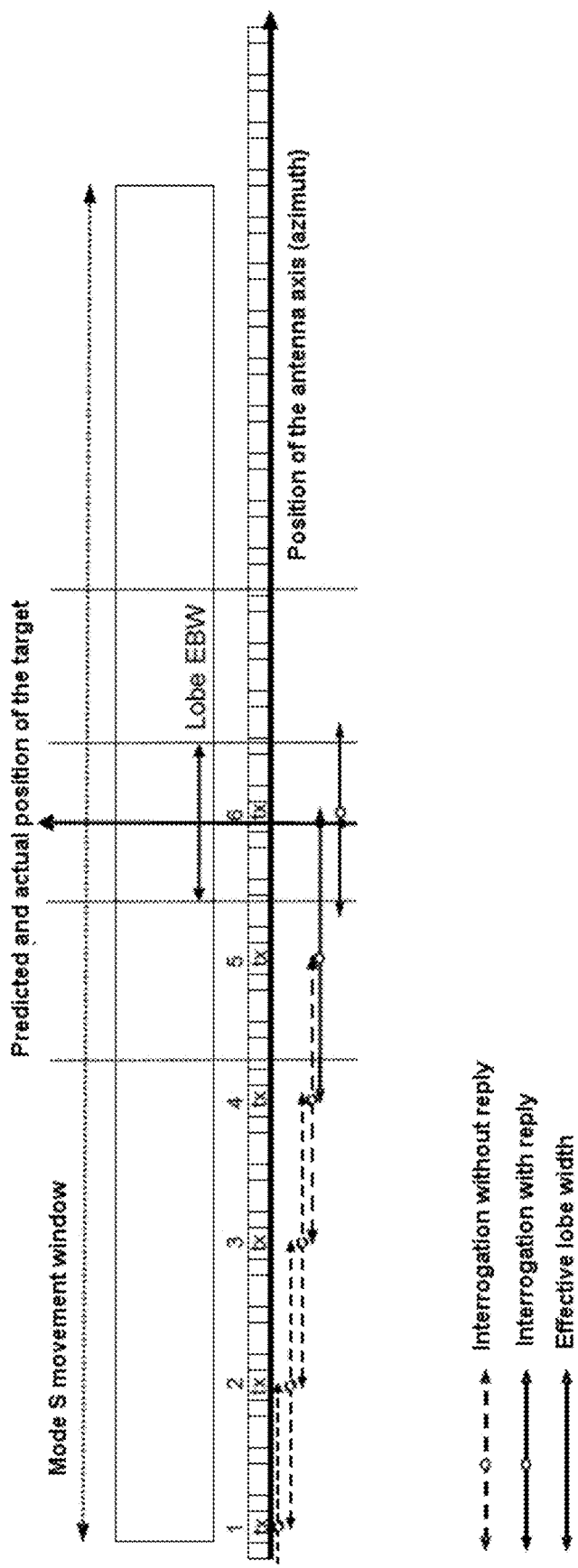

FIGS. 6a and 6b illustrate sequencings of interrogations for a non-moving target. In this case, the actual position of the target coincides with the predicted position of the target. For these figures, the arrows in broken lines correspond to interrogations (TX) that have failed, and the arrows in solid lines correspond to interrogations (TX) that have obtained a reply. The lengths of the arrows correspond to the width of the lobe processed by the radar. The same coding is used subsequently for FIGS. 7a and 7b.

FIG. 6a corresponds to a standard sequencing and FIG. 6b corresponds to a sequencing according to the invention. The predicted position of the target and the beams are shown in the same mode of representation as that of FIG. 5, supplemented as follows:

the periods All Call_AC (for the surveillance of SSR transponders and non-selective mode S interrogations) are represented by small squares;

the periods Roll Call_RC (for selective mode S surveillance) are represented by larger rectangles (conventionally, an RC lasts ≈2 times as long as an AC);

an RC period for selective interrogations is, for example, about 0.7°, depending on the rotation speed of the radar antenna.

The position of the antenna is represented by circles in relation to the misalignment of the antenna axis with respect to the predicted position of the target, the transmissions of interrogations for this target being identified by the symbol "tx" in the RCs.

In the case of FIG. 6a (standard sequencing), the narrowness of the beam ("Standard Beam") makes it necessary to transmit many interrogations, notably the more the beam is approached, because the probability of the presence of the target increases there in practice.

In the case of FIG. 6b, according to the invention, the effective beam EBW for the target is dynamically modified, according to FIG. 5, on the basis of the position of the antenna axis relative to the predicted position of the target. The number of interrogations is then adapted to the effective width of the beam. For example, in FIGS. 6a, 6b, 7a and 7b, the overlap of lobes between two successive interrogations is chosen to be constant at one half-lobe, to enable other mode S transactions to be performed with the same target once the latter has been detected. In particular, the number of interrogations may be reduced when the width of the beam is increased ("Wide Beam", then "Enhanced Wide Beam"), therefore reducing the number of unnecessary interrogations during the search following the movement of the target as a result.

Figure 7A:
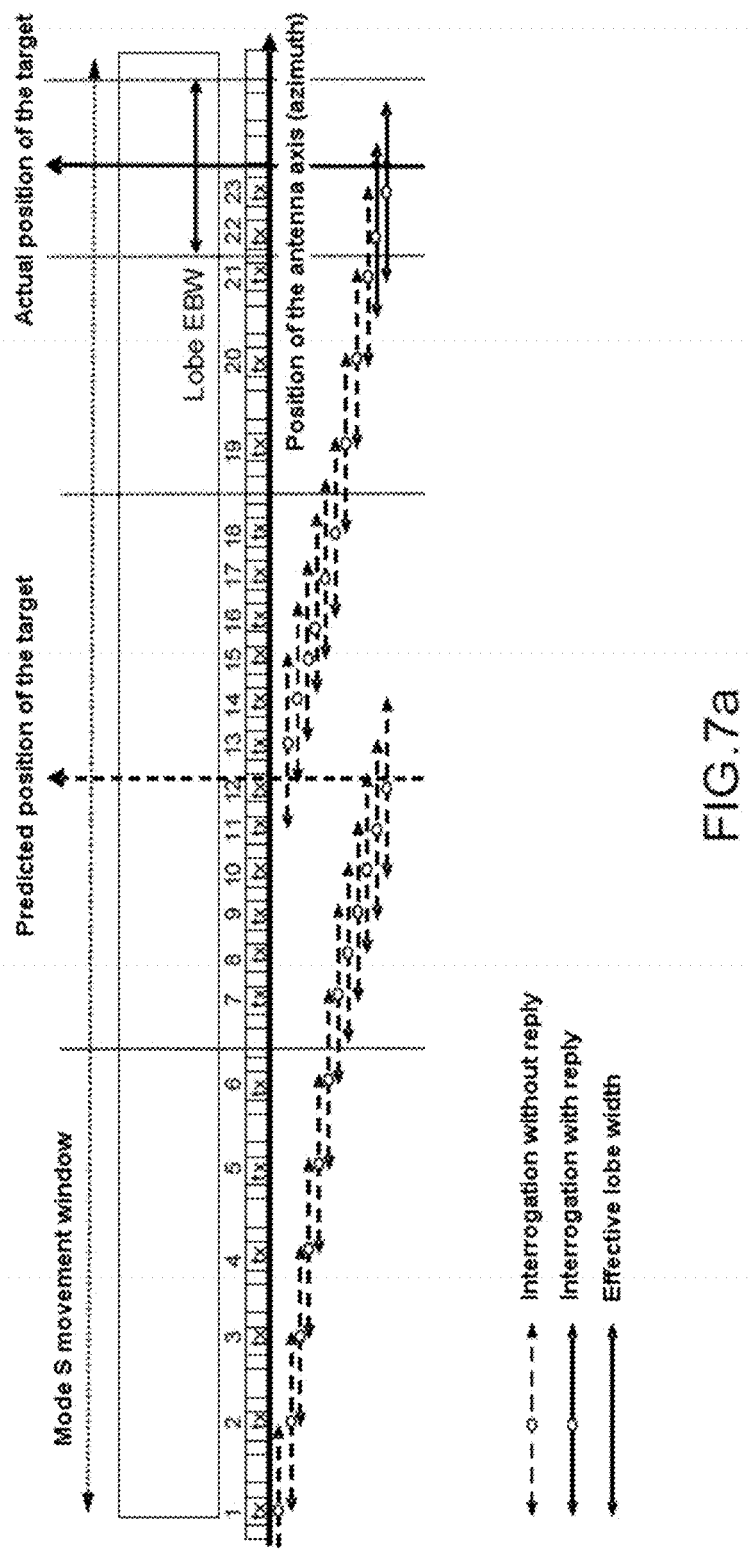
FIGS. 7a-7b show an illustration of interrogation sequencings for a moving target (in azimuth increasing from rotation to rotation), of the standard type and according to the invention, respectively.
Figure 7B:
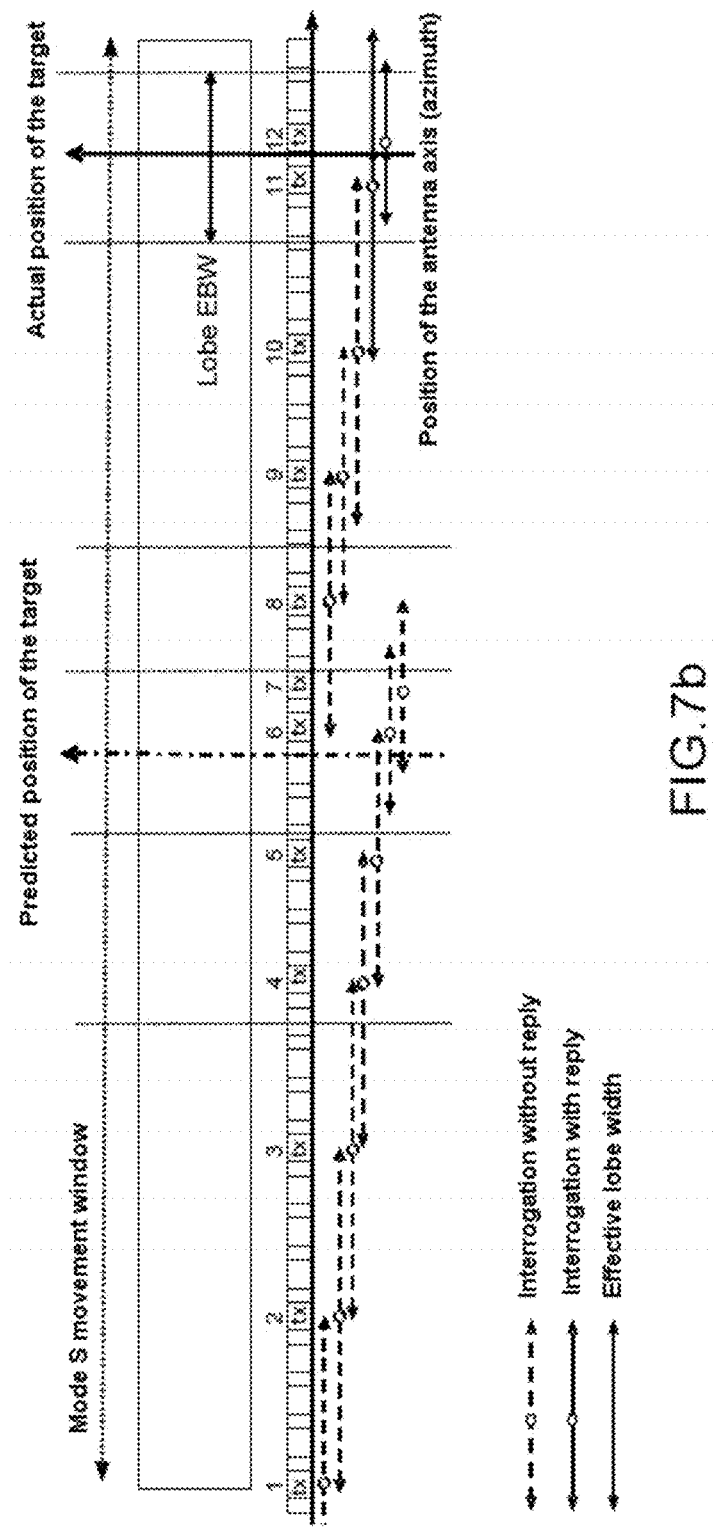

FIGS. 7a and 7b illustrate sequencings of interrogations for a moving target. In this case, the actual position of the target differs from the predicted position of the target, since it has moved with an increasing azimuth, this being the worst case of unnecessary selective interrogations.

FIG. 7a corresponds to a standard sequencing and FIG. 7b corresponds to a sequencing according to the invention. The predicted position of the target, together with its actual position, and the beams are shown in the same mode of representation as that of FIG. 5. In the case of FIG. 7a, the narrowness of the beam makes it necessary to transmit a large number of interrogations. In the case of FIG. 7b, the adaptation of the number of interrogations to the beam width, modified dynamically on the basis of the misalignment of the antenna relative to the predicted or actual position of the target, again in this case enables the total number of interrogations to be significantly reduced.

The comparison between FIGS. 6a and 6b on the one hand, and between FIGS. 7a and 7b on the other hand, shows that the invention can provide a saving of 50% to 60% on the rate of unnecessary interrogations naturally caused by the movement of the targets. This is because, in the case of the non-moving target, there are 4 unnecessary interrogations (FIG. 6b) instead of 10 (FIG. 6a), and, in the case of a moving target, there are 10 unnecessary interrogations (FIG. 7b) instead of 21 (FIG. 7a).

Figure 8A:
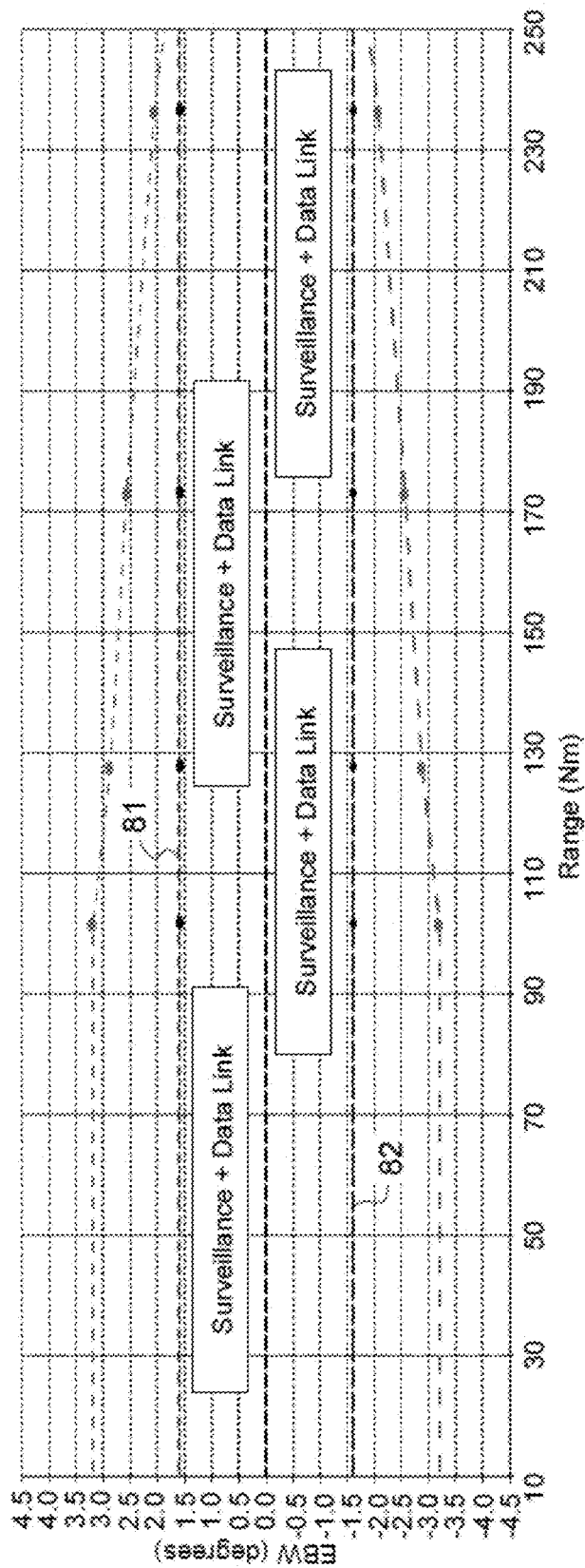
FIGS. 8a-8c show an illustration of the mode S transactions as a function of the distance to a target, in standard mode, with a widened beam of the "Wide Beam" type, and with a widened beam of the "Enhanced Wide Beam" type, respectively.
Figure 8B:
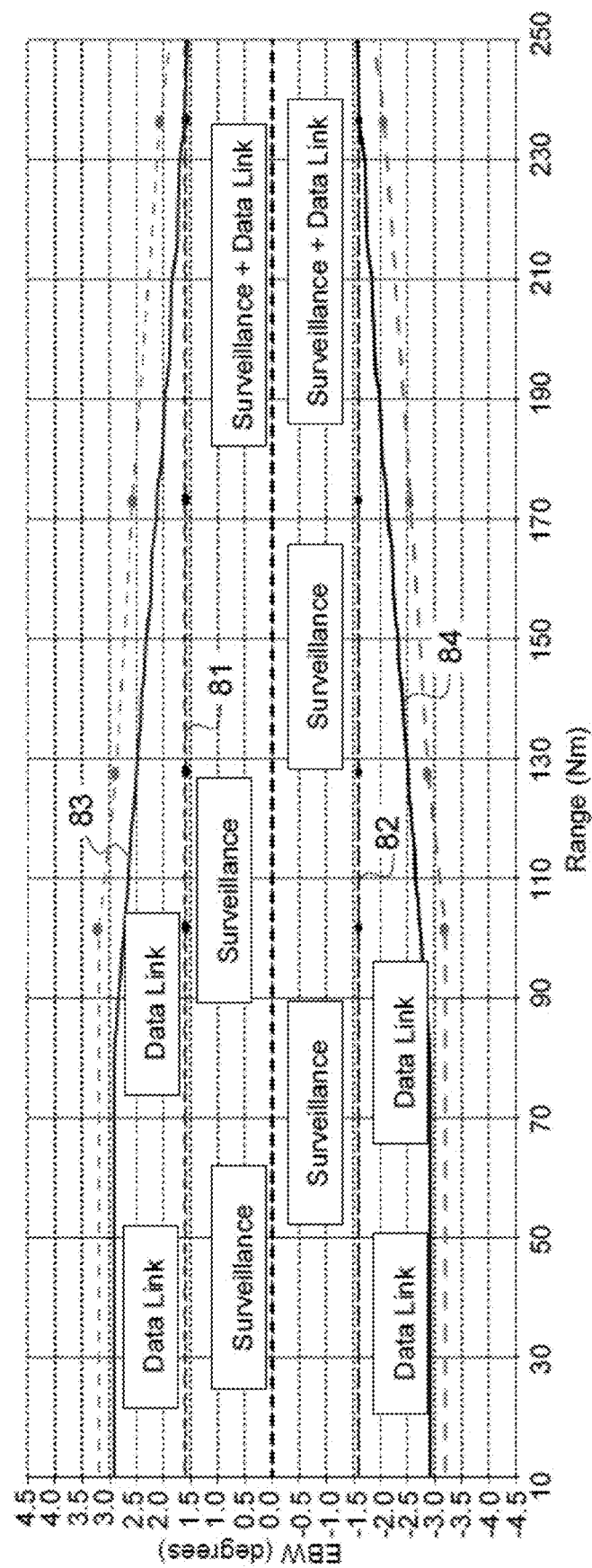
Figure 8C:
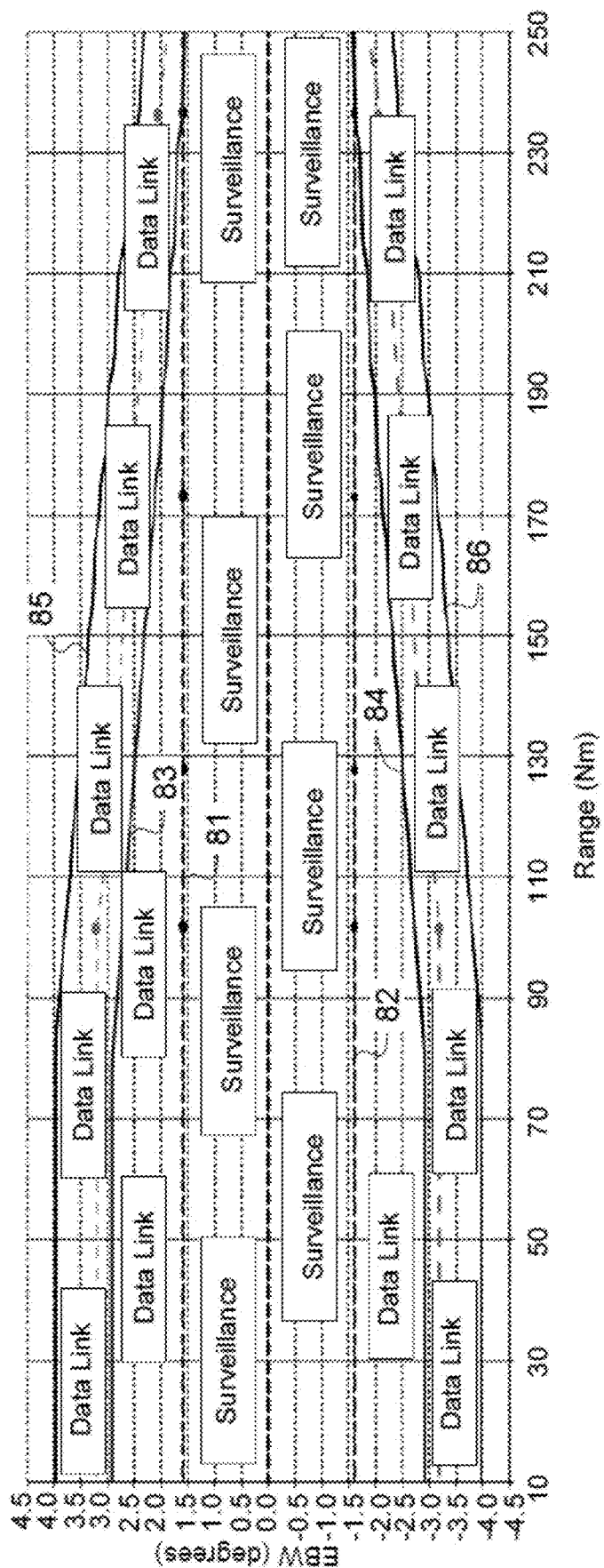

FIGS. 8a, 8b and 8c illustrate mode S transactions as a function of the distance to a target, more particularly the control of mode S transactions according to their kind in the beam. In these figures, the ordinate represents the beam width in azimuth and the abscissa represents the distance.

FIG. 8a illustrates the standard case ("Standard Beam") where the transactions (surveillance and data) are all performed in a central beam, having a given width, delimited by the lines 81, 82, this width typically being equal to about 3°, in accordance with certain operational requirements, which may even cause the effective lobe to be reduced to 2.4° to ensure the location of any mode S transaction in surveillance.

FIGS. 8b and 8c illustrate forms of control according to the invention for a "Wide Beam" case and for an "Enhanced Wide Beam" case, respectively.

An aim of this control according to the invention is, notably, to process a higher local workload of mode S transactions in azimuth, typically 3.5° according to the operational requirements of Eurocontrol, by distributing this workload in a widened beam of the "Wide Beam" or "Enhanced Wide Beam" type, depending on the radar equipment level.

For this purpose, the method according to the invention also advantageously uses the adaptation of the beams on the basis of the number of mode S transactions to be carried out, thus providing optimum control of these transactions.

The radar thus establishes the number of mode S transactions to be carried out in a given beam width, for example 3.5°, in the next azimuth section, for example the next 5 degrees.

If this number of transactions exceeds the mode S transaction capacity for a standard lobe ("Standard Beam") for the radar configuration (rotation speed, antenna type, mode of interrogation to be carried out, instrumented radar range, etc.), the radar dynamically widens 83, 84 the mode S effective beam EBW to the "Wide Beam" type for each target in this beam according to the number N of transactions to be carried out with this target.

In order to position N−1 transactions per target outside the main lobe, the radar:
pre-locates the target at the edge of the main lobe by deviation measurement between the signals of the DIFF and SUM, or DIFF and CONT, patterns;
retains a transaction, whether data link or other, in the centre of the lobe so as to position the target precisely in azimuth, thus fulfilling the surveillance task.

FIG. 8b illustrates this case. The workload (surveillance and data link) is then distributed over 6° up to half the distance of a long-range radar (about 170 NM in the example in the figure). This advantageously enables more than 50% of the illumination time to be saved, depending on the distribution of the targets in terms of distance, relative to the standard lobe ("Standard Beam").

FIG. 8c illustrates the case where use is made of the beam denoted "Enhanced Wide Beam", which the radar can implement if it has the requisite equipment. In this case, the widening of the beam 85, 86 enables the data link transactions to be distributed even more, for practically all aircraft, over 8° up to half-distance and over more than 5° at long distance. FIG. 8c shows that data may advantageously be transmitted (data link) on the edges of the beam, and in a larger number overall.

FIGS. 8b and 8c show that the invention advantageously provides dynamic control of the transactions, by dynamic adaptation of the radiated beams, notably on the basis of the proximity of the targets (aircraft), on the basis of the number of aircraft to be controlled in azimuth, that is to say, ultimately, on the basis of the workload distribution and the number of aircraft in azimuth.

The dynamic and adaptive control of the beam may also be applied to very long-range targets having a low rate of reply, due for example to their presence in a geographical area with a high rate of interrogation by other sensors. To increase the number of selective interrogations on this target, required in order to detect it despite its low rate of reply, the radar interrogates on DIFF, then on SUM, and finally continues on DIFF if necessary, until the radar has obtained the required replies from the target. In the case of a target at long range, the movement window is very small, being reduced in practice to the noise window of the radar, and the target is therefore completely known in terms of position, and the radar may thus use the SUM or DIFF pattern with certainty in order to interrogate according to the deviation in azimuth between the axis of the antenna and the predicted position of the target.

FIG. 9a shows the typical effective lobe with an ATC antenna of a target at very long distance, conventionally viewed by the radar at zero elevation, for which the radar picture conventionally only allows a lobe modulation of about 4 dB, resulting in an end of range effective lobe EBW of about +/−1.25°.

Figure 9B:
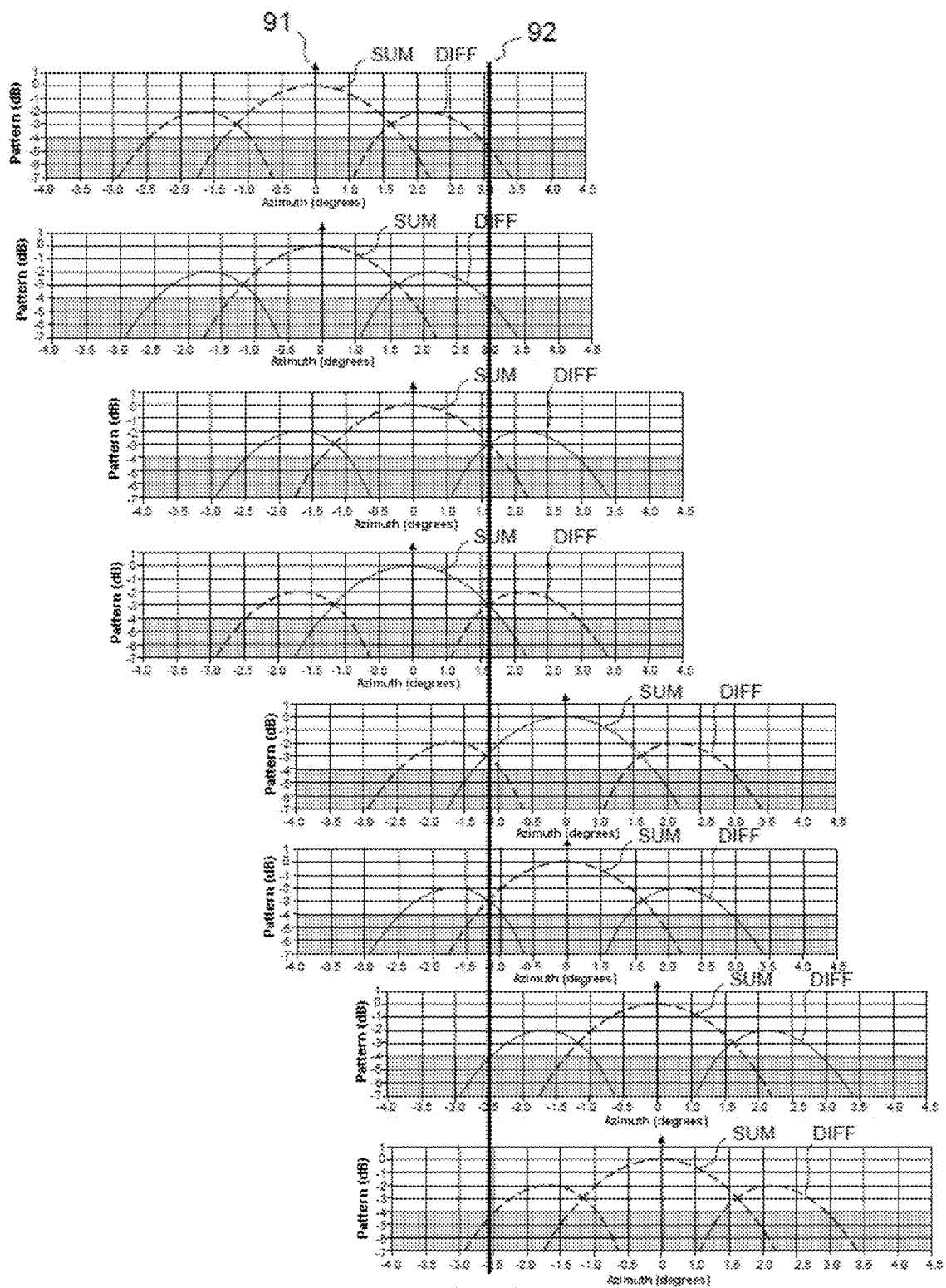

FIG. 9b shows, in steps, the dynamic control of the beam for a target at long range, respectively:
when the azimuth 91 of the antenna axis is lower than 2.5° of the azimuth of the predicted position of the target, represented by a line 92, the radar does not interrogate this target;
when the azimuth of the antenna axis is lower, between 1.2° and 2.5° of the azimuth of the predicted position of the target, the radar selectively interrogates this target, using the DIFF pattern;
when the azimuth of the antenna axis is between −1.2° and 1.2° of the azimuth of the predicted position of the target, the radar selectively interrogates this target, using the SUM pattern;
when the azimuth of the antenna axis is greater, between 1.2° and 2.5° of the azimuth of the predicted position of the target, the radar selectively interrogates this target, using the DIFF pattern;
when the azimuth of the antenna axis is greater than 2.5° of the azimuth of the predicted position of the target, the radar no longer interrogates this target.

By using this approach for targets with a low detection rate due to a polluted environment, it is therefore possible to double the effective lobe and thus, by doubling (the EBW changes from ≈2.5° to 5°) the number of selective interrogations on this target, to improve its detection by the radar.

The invention has been described for use by an ATC secondary radar. It is also applicable for an IFF radar which has to resolve the same problems.

The invention claimed is:
1. A secondary radar comprising:
an antenna having a radiating pattern forming a sum channel, called SUM, a radiating pattern forming a difference channel called DIFF and a pattern forming a control channel called CONT,
a generator for generating at least interrogation messages on the SUM channel and Interrogation Side Lobe Suppression (ISLS) signals on the CONT channel,
a transmitter for transmitting these messages via the SUM channel and via the CONT channel respectively, and
a receiver for receiving and processing signals received via the SUM, DIFF and CONT channels, configured for detecting replies of targets on signals received via the SUM and/or DIFF channels and carrying out deviation measurement processing and Receiver Side Lobe Suppression (RSLS) processing on these replies,
wherein the transmitter is configured so that, for each target independently, a width of a beam for transmitting interrogations and receiving mode S selective replies is controlled dynamically on a basis of a movement window of said target and the position of an axis of said antenna in said movement window, in order to provide the detection of said target while reducing a number of selective interrogations by a selective sub-interrogation of said target and while ensuring its precise positioning in azimuth:

by pre-locating said target at an edge of a main reception lobe of said antenna by deviation measurement between the signals received on the DIFF and SUM channels; and by selectively re-interrogating said pre-located target in mode S by calculation of a roll-call period nearest to a center of said main reception lobe to ensure precision in azimuth.

2. The secondary radar according to claim 1, wherein the transmitter is configured in such a way that, for each target, the width of the beam for transmitting interrogations and receiving mode S selective replies is controlled on a basis of a pre-evaluated number of selective transactions to be processed in a given azimuth, said beam being widened independently for each target if said number is greater than a potential achievable number of selective transactions in a standard beam:

by distributing what are known as "data link" transactions outside said standard beam, which is then mainly dedicated to surveillance;

by pre-locating the target at the edge of said main lobe by extended deviation measurement, using the replies received on the DIFF and SUM channels; and by retaining a transaction, of a "data link" or other type, and selectively re-interrogating said pre-located target in mode S by calculation of the roll-call signal nearest to the center of said main lobe to ensure precision in azimuth.

3. The secondary radar according to claim 1, wherein the increase in a width of a mode S selective interrogation transmission beam is achieved by attenuation of a field radiated by the CONT pattern.

4. The secondary radar according to claim 1, wherein the generator also being configured for additionally generating interrogation messages on the DIFF channel, and the transmitter also being configured to be capable of transmitting these messages via the DIFF channel of the antenna, said radar pre-locates the target at the edge of said main lobe by deviation measurement, using the replies received on the DIFF and CONT patterns.

5. The secondary radar according to claim 4, wherein the increase in a width of a mode S selective interrogation transmission beam is achieved by using the DIFF channel for transmitting said interrogations and reducing a field radiated by the CONT pattern.

6. The secondary radar according to claim 1, wherein the transmitter is configured in such a way that, for each target, the width of the beam for transmitting interrogations and receiving mode S selective replies is controlled on a basis of a pre-evaluated number of selective transactions to be processed in a given azimuth, said beam being widened if said number is greater than a potential achievable number of selective transactions in a standard beam:

by distributing what are known as "data link" transactions outside said standard beam, which is totally allocated to surveillance;

by pre-locating the target at the edge of said main lobe by highly extended deviation measurement, using the replies received on the DIFF and CONT patterns; and by retaining a transaction, of a "data link" or other type, and selectively re-interrogating said pre-located target in mode S by calculation of the roll-call signal nearest to the center of said main lobe to ensure precision in azimuth.

7. The secondary radar according to claim 1, wherein the transmitter is configured in such a way that, for each target, the width of the beam for transmitting interrogations and receiving mode S selective replies is controlled on the basis of a rate of detection of aircraft replies for which a number of interrogations is thus potentially doubled by selectively interrogating each target of this type successively on DIFF, then SUM, and finally on DIFF if this is still necessary.

8. The secondary radar according to claim 1, wherein the secondary radar is of an Air Traffic Control (ATC) type.

9. The secondary radar according to claim 1, wherein the secondary radar is of an Identification Friend or Foe (IFF) type.

* * * * *